Figure 1:
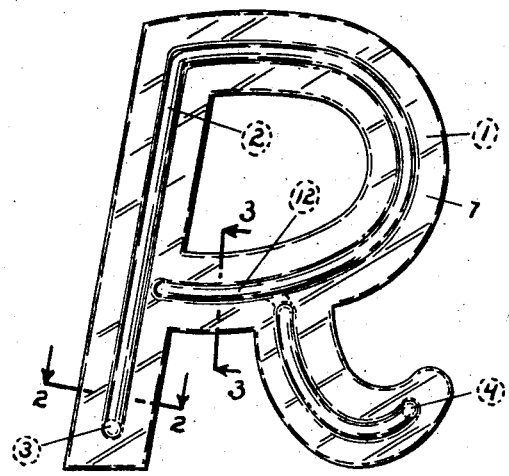

Nov. 5, 1940.                H. R. OWEN                2,220,348
                        LUMINOUS TUBE DISPLAY
                     Filed July 18, 1938        2 Sheets-Sheet 1

INVENTOR
Harold Ray Owen

Nov. 5, 1940.  H. R. OWEN  2,220,348
LUMINOUS TUBE DISPLAY
Filed July 18, 1938  2 Sheets-Sheet 2
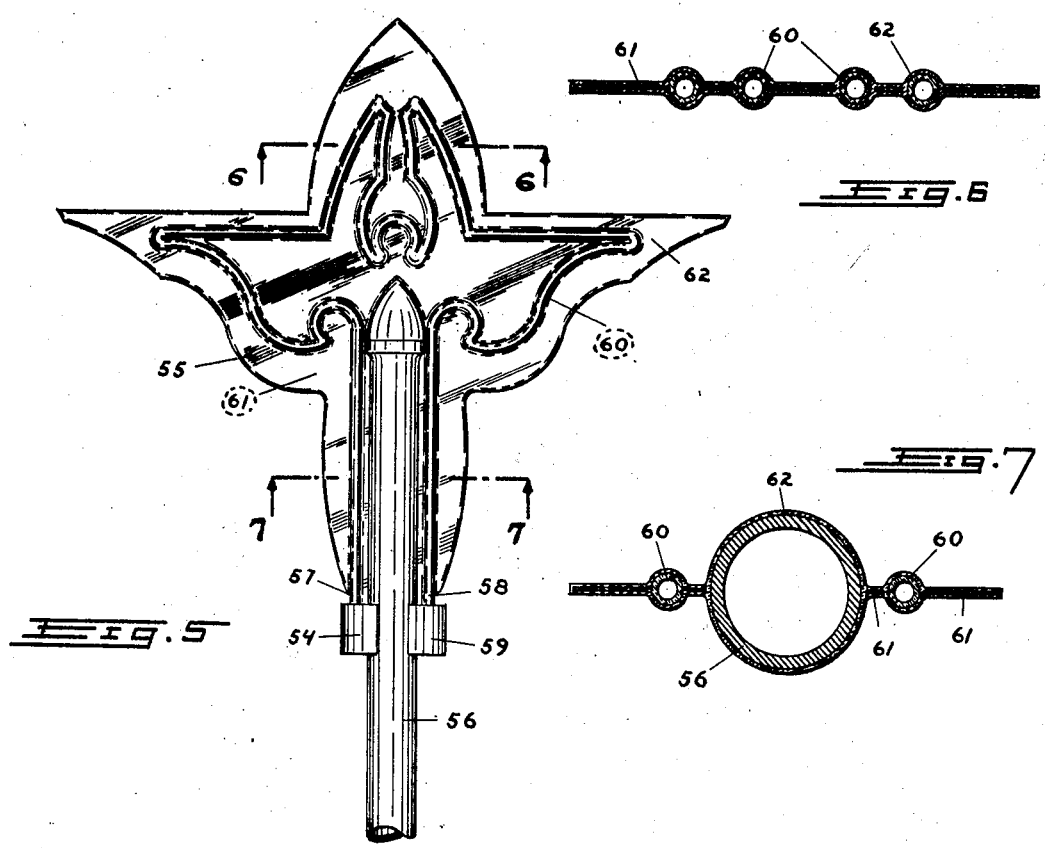
INVENTOR
Harold Ray Owen Patented Nov. 5, 1940

2,220,348

UNITED STATES PATENT OFFICE 2,220,348

LUMINOUS TUBE DISPLAY

Harold Ray Owen, Los Angeles, Calif., assignor to Electrical Products Corporation, Los Angeles, Calif., a corporation of California Application July 18, 1938, Serial No. 219,789

4 Claims. (Cl. 40—130)

This invention relates to luminous gaseous conduction tube displays and is directed to the production of electric signs, sign character units and the like from preformed gaseous tubes and plate members assembled into unitary structures by plastic coatings.

One object of the invention is to produce display units in which the tubing is exposed only in those portions descriptive of the display and all return bends, cross overs, and electrode end bends are concealed from view. The displays constructed hereaccording present clean cut finishes and are free from the projecting tube supporting posts which characterize the signs of the prior art.

The use of supporting posts for mounting tubes is nearly universal in the prior art devices and is followed for both reasons of electrical insulation and mechanical factors. These posts consist of glass stands held by metal clips at the sign body. The tubes are held to the stands by soft copper wire which is usually quite lightly tied. The result is a semi-flexible combination which permits the tubes, which are quite fragile, to become adjusted to inaccuracies of construction and spring of the display mountings.

One object of this invention is to provide display units which are characteristically rigid as contrasted with prior art construction. This is accomplished without danger of tube breakage by taking advantage of the greatly increased strength of glass tubing when sheathed by plastic coatings. I have found that plastic sheathing may be used to increase the strength of tubing to such a degree that it is not necessary to provide the semi-flexible mounting of the prior art. In fact, not only may the tubing be fabricated into comparatively rigid structures, but it may actually be counted upon to provide a measure of strength in itself.

In my copending application, Serial No. 217,109 of July 1, 1938, I disclose the production of glass tubing of surprising strength secured by the application of plastic coatings under tension. It has been found that a certain plastic material, when applied to a tube, contracts and stresses the glass in compression to such an extent as to develop strength simulating that of tempered glass. The instant invention preferably utilizes this feature although it may be practiced in various of its forms with plastic sheathing around the tubing which stresses the tube to a lesser degree, that is, to a degree insufficient to develop the increased strength of the glass and incidental only to securing a firm bond between the plastic and the glass. Nitro cellolose and cellulose actetate are suitable materials for this purpose. Coatings which have negligible shrinkage may be prepared from the various vinyl derivatives, particularly vinyl acetate, to which a small percentage of plasticizer has been added, tricresyl phosphate being a suitable plasticizer for this purpose.

Another object of the invention is to provide display units, such as sign characters, in which only the inscription portions of the tubing are visible through slots in character plates. In this connection I show several specific embodiments in the drawings, particular reference being had to border tubing shown with decorative silhouette plates fabricated to the tubing.

Another object is to provide display units which will be self supporting as projecting ornamentations for supports such as sign bodies, and particularly as applied to double face displays in which the single tube serves for showing in both directions.

Another object of the invention is to provide for the use of character plates in conjunction with stressed plastic coatings without danger of buckling the plates, by providing for the balancing of the stress between opposing coatings. This feature is of moment in connection with tubes which are sheathed with shrinking coatings in signs in which it is desired to coat the plates and tubes in the same operation with the same material. A decided advantage is had in the production thereby of structures in which the weight is held low by using thin plates and taking full advantage of the strength of the sheathed tubes.

Another object of the invention is to provide for the suspension of the tubing by a plastic webbing in a slot in a plate. This webbing, ordinarily under tension, permits of relative expansion between the tube and the plate during temperature changes. This feature becomes of importance with displays in which tubes of considerable length are used.

Further objects of the invention have to do with specific embodiments thereof set forth in detail below. It is to be understood that the particular embodiments of the invention are set forth by way of generic illustration of the invention which may be variously modified and embodied within the purview of the claims in all types of display devices.

Additional objects of the invention will be apparent from the following specification.

The invention is shown in various typical embodiments in the accompanying drawings in which the same numeral appearing in more than one view is to be understood as referring to the same or the equivalent part throughout.

Figure 2:
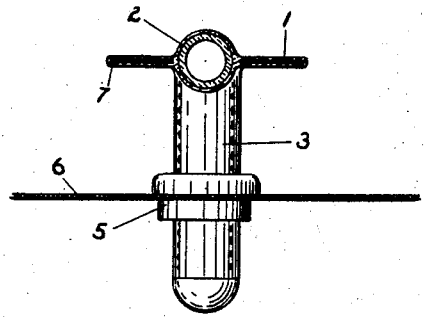
Figure 3:
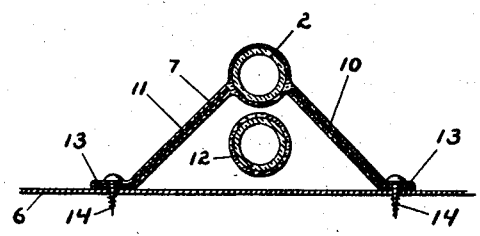

Figure 1 is a front elevation of a unitary sign character having a tube sealed in a slot in a letter plate. Figure 2 is sectional view of the same taken as indicated by the section line 2—2 and additionally showing the electrode terminal detail in connection with the sign body to which the letter is mounted. Figure 3 is a cross section of a raised letter having an appearance in front elevation similar to that of Figure 1 and taken as indicated by the section line 3—3 of Fig. 1. The concealment of the return bend portion of the tubing is clearly shown.

Figure 4:
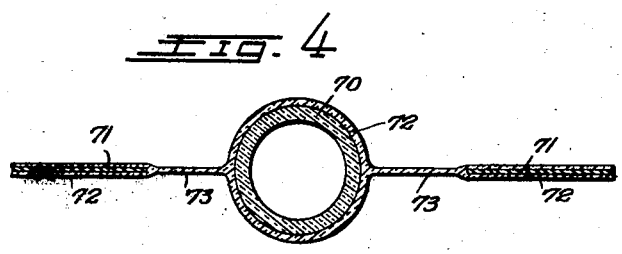

Figure 4 is a cross section through a display unit illustrating the principle of the web suspension of a tube in a slot in a plate.

Figure 5 is a front elevation of a post type lighting fixture in which lighting tubes in ornamental form are sealed in grooves in a plate. Figure 6 is a cross section taken as indicated by the section line 6—6. Figure 7 in a cross section taken as indicated by the section line 7—7.

The character shown in Figure 1 includes a metal character plate, indicated by numeral 1, having a slot in which is positioned the gaseous conduction tube 2. The tube is provided with the usual electrode terminals as 3 and 4 which project backward into suitable housings or bushings in a sign body such as indicated by the bushing 5 in the body sheeting 6 in Figure 2. The slot should be somewhat wider than the tube to provide electrical insulation and for reasons of good construction. A plastic coating 7 is applied all around the tube and on both sides of the plate. This coating may be of the shrinking type and with characters of the type shown, special provisions to prevent warpage of the plates and slippage of the coating on the plates is not usually necessary but may optionally be used.

A suitable method of constructing the various devices shown herein is disclosed in my copending application, Serial No. 219,787, filed July 18, 1938, according to which gaseous conduction tubes are fabricated into unitary structures with supporting frames or decorative materials bonded together and enclosed in plastic sheathings. As applied to the instant invention, the tubing and the plate are both positioned on and partially embedded in a masking body with one half of the tube and one side of the plate exposed. A liquid plastic is applied to the exposed surfaces and the intervening surface of the masking body, the assemblage is removed from the mask after the plastic has set, and a coating of plastic applied to the remaining surfaces to seal the whole together. The tubing may, if desired, be coated with a shrinking plastic before this application. Any other suitable method of fabrication may, of course, be used.

In the letter shown sectionally in Figure 3, and appearing in front elevation the same as Figure 1, the character is of the raised type, the side walls 10 and 11 sloping upward to the apex which is slotted to receive the tube 2. The return bend 12 of the tube is thus completely concealed within the letter making for clean cut signs. The letter walls are flanged at 13 and held to a sign body by the sheet metal screws 14. The letter and the tube are coated with plastic, the same condition applying as discussed above.

In the lighting standard shown in Figure 5 a double faced unit 55 is positioned on the top of a post 56 and sealed as a unit to it. The electrode terminals 57 and 58 fit into the housings 54 and 59 on the post and wiring is run up through the post to supply current to the tubing. The tube 60 is in decorative form and fits into a slot in the ornamental plate 61 and shows in both directions. A plastic coating 62 covers tube and plate and preferably seals the whole to the post, although optionally the unit may be made removable. The cross sections of 6 and 7 show the relation of these elements. In displays of this type the matter of the relative expansion of the tube and the plate becomes of importance.

The construction shown in cross section in Figure 4 provides for relative displacement of tube and plate during temperature changes. It may also be used as a suspension for tubes which are not deemed sufficiently strong to resist the buckling of long display members in which they are sealed.

In that view the tube 70 is positioned in a slot in plate 71 which is of considerably greater width than the tube. The plastic coating 72 sheathes the tube, covers both near surfaces of the plate and extends as a webbing 73 between the tube and plate. This construction is of particular importance when used with tension coatings which serve to hold the tube in position with little vibration while permitting relative expansion between tube and plate.

The plastic coating should preferably cover both sides of the sheeting. Tension coatings are also advantageous with this construction for many purposes.

The term "plastic" is used in the generic sense to include all substances which are applied from a soft or fluid state to set as solids which are non-shatterable under ordinary conditions of use and ordinary temperatures.

The term "gaseous conduction tubing" embraces illuminating devices of all types comprising elongated tubular bodies charged with fluid, vapor or gas and caused to become luminous by the application of electric energy thereto.

Having thus described my invention, what I claim is:

1. A gaseous conduction lighting display including a sheet member having a slot, a gaseous conduction lighting tube positioned in said slot, said slot being of materially greater width than said tube, and a plastic sheathing around said tube integral with a plastic webbing extending from said tube to the adjacent edges of said sheet member and beyond said edges to cover portions of at least one surface of said sheet member around said slot.

2. A gaseous conduction lighting display including a slotted sheet member, a gaseous conduction lighting tube positioned in the slot thereof and of materially lesser width than said slot, a plastic sheathing under tension around said tube, and a plastic webbing integral with said sheathing extending therefrom across the open spaces of said slot to the adjacent edges of said sheet member and beyond said edges to cover portions of at least one surface of said sheet member around said slot.

3. A gaseous conductor lighting display including a slotted sheet member, a gaseous conduction lighting tube positioned in the slot thereof and of materially lesser width than said slot, a plastic sheathing under tension around said tube, and a plastic webbing integral with said sheathing extending under tension therefrom across the open spaces of said slot to the adjacent edges of said sheet member and beyond said edges to cover portions of at least one surface of said sheet member around said slot.

4. A gaseous conduction lighting display including a slotted sheet member, a gaseous conduction lighting tube positioned in the slot thereof and of materially lesser width than said slot, a plastic sheathing under tension around said tube, a plastic webbing integral with said sheathing extending under tension therefrom across the open spaces of said slot to the adjacent edges of said sheet member, and plastic coatings integral with said webbing covering the surfaces of said sheet member around said slot.

HAROLD RAY OWEN.